J. RINDALL.
GUIDE CHART.
APPLICATION FILED OCT. 21, 1911.
1,039,322.
Patented Sept. 24, 1912.
2 SHEETS—SHEET 2.
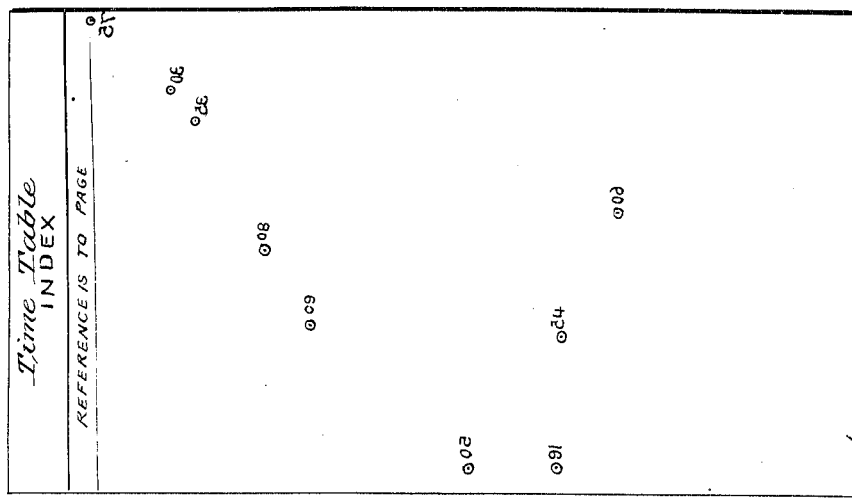
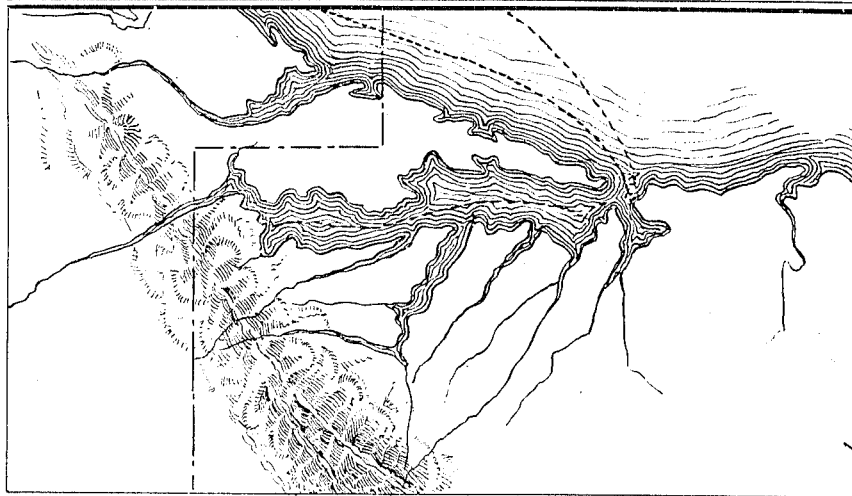
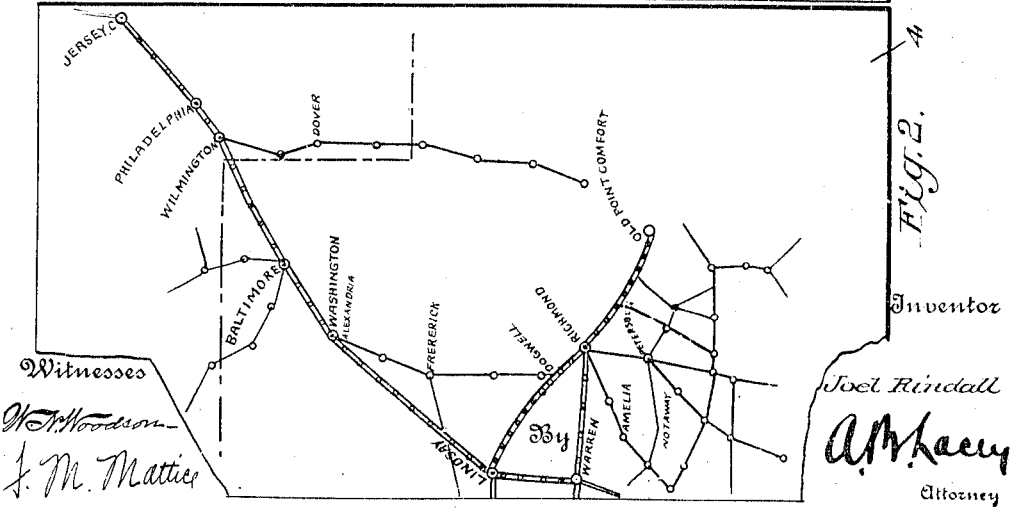

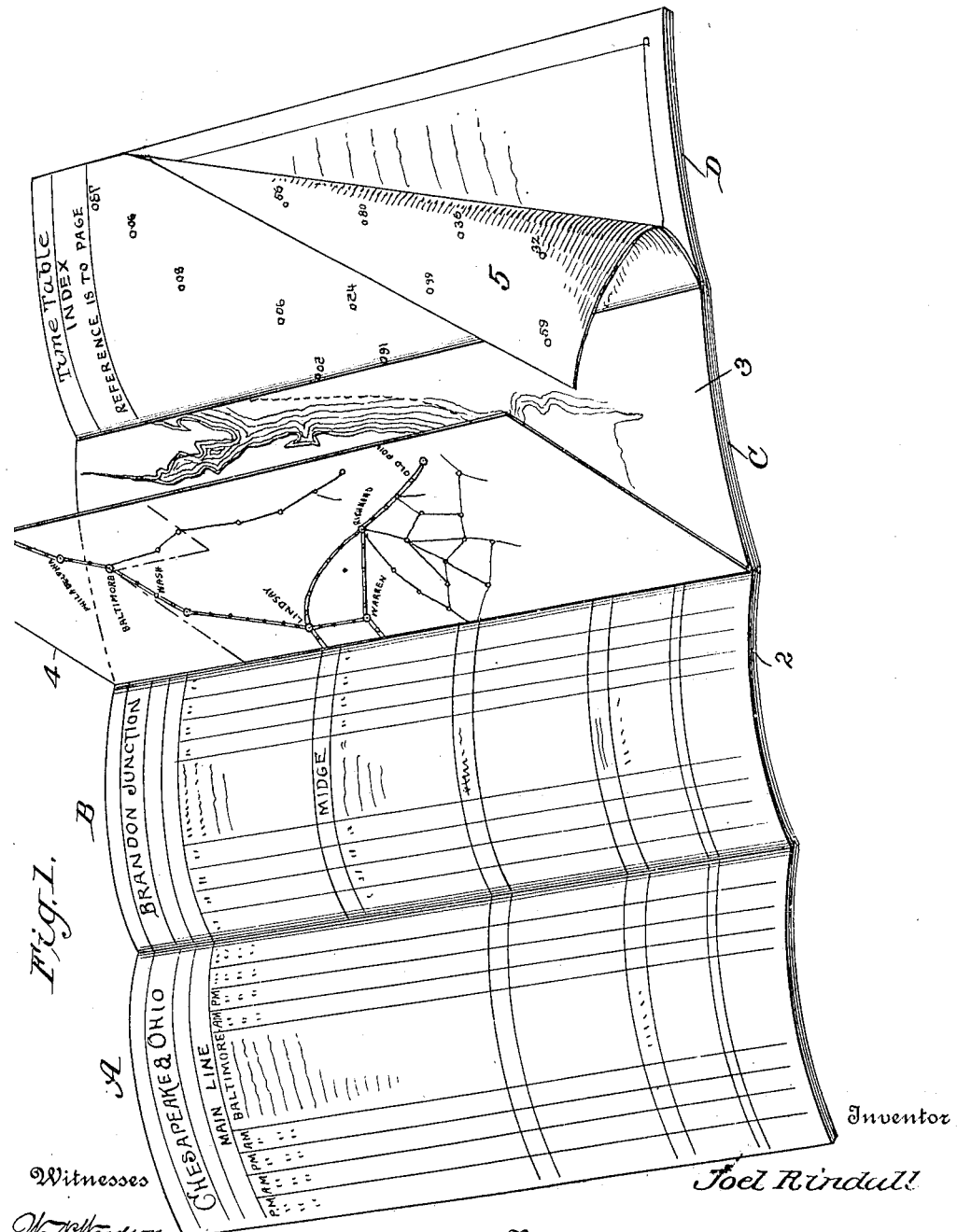

UNITED STATES PATENT OFFICE.

JOEL RINDALL, OF RHINELANDER, WISCONSIN, ASSIGNOR OF ONE-HALF TO HENRY N. SEGERSTROM, OF RHINELANDER, WISCONSIN.

GUIDE-CHART.

1,039,322.  Specification of Letters Patent.  Patented Sept. 24, 1912.

Application filed October 21, 1911. Serial No. 655,998.

*To all whom it may concern:*

Be it known that I, JOEL RINDALL, a citizen of the United States, residing at Rhinelander, in the county of Oneida and State of Wisconsin, have invented certain new and useful Improvements in Guide-Charts, of which the following is a specification.

My invention relates to charts and particularly to a chart peculiarly adapted for use in railway folders, the invention consisting, generally speaking, in the provision with a chart of one character of transparent charts of other character which are adapted to be superimposed upon the first named chart and register therewith.

In ordinary charts, and by the term "charts" I refer not only to the maps of a country but also to anatomical or mechanical charts as well, the broad features of the chart are often obscured by a mass of detail. Thus for instance railroad maps are often rendered very puzzling by reason of the presence thereon of town names, railway lines, road lines and topographical symbols and, furthermore, because of the fact that these names, lines, symbols, etc. must be printed thereon it is practically impossible to print other information on the chart such as statistical information, symbols indicating the character of the soil or the character of the manufactures, or contour lines to indicate topographical characteristics.

My invention has for its main object the provision of a chart wherein one chart or leaf shall have shown thereon the broad features of the object charted, and other transparent or translucent sheets or leaves, adapted to register with the first named sheet or leaf, shall have thereon the details of the object shown on the first named sheet so that the detail sheets may be superimposed on the basic sheet and read in connection therewith.

Another object is the provision of a chart having connected sheets or leaves adapted to be turned over upon and into register with each other so that the matter printed upon one leaf may be seen through the superimposed leaf and read in connection therewith.

A further object is the provision in connection with a railway folder having time-tables and like information printed thereon, of a leaf having printed thereon a general map of the district traversed by the railway, and in connection therewith a plurality of conjoined transparent leaves adapted to be folded over upon the map carrying leaf and having printed thereon the names of stations, lines of railway, etc., so that the map proper shall show only the broad features of the district, while the transparent leaves shall contain the details which would otherwise obscure the said map if printed thereon.

A further object is to provide in connection with a railway folder and map as above described, a transparent leaf adapted to be folded over upon the map or upon that leaf having printed thereon the names of stations, a transparent leaf having thereon index points adapted to register with the various stations printed on the before mentioned leaf, and in connection with the index points numerals or other characters denoting the pages upon which information relative to said towns or points may be found within the folder.

Other objects will appear in the course of the following description.

My invention is illustrated in the accompanying drawings wherein:

Figure 1 is a perspective view of a railway folder with my chart mounted in connection therewith. Fig. 2 is a face view of one section of the chart. Fig. 3 is a face view of the map section of the chart. Fig. 4 is a face view of the index section of the chart.

Corresponding and like parts are referred to in the following description and indicated in all the views of the accompanying drawings by the same reference characters.

In the drawings I have shown my improved chart as applied to a railway folder. The usual railway folder comprises a plurality of sheets adapted to be folded over upon themselves, thus providing separate leaves, the folder being relatively elongated. Upon these leaves is printed the time-tables, information as to trains, etc. Usually a map is provided forming either an insert in the folder or printed upon one or more of the leaves.

In the drawings 2 designates an ordinary railway folder shown as being opened out and shown as being foldable so as to provide the several leaves A, B, C and D. These leaves are arranged in any suitable manner and inserted within the folder and forming part thereof is a leaf 3 having thereon a map of the country through which the railway passes. This map may be of any desired character. Preferably, however, it is a topographical map showing the contours of the country, the main divisions thereof, and this may show by differently colored spaces the crops for which the soil is particularly adapted, the woody portions of the country, mining lands etc. I, of course, do not wish to limit myself to any particular arrangement for this map as it may be of any desired character. Preferably all or most of the names are left off of this map so that the contour lines, topographical symbols etc. on the map will not be confused by extraneous matter.

Conjoined with the map 3 and preferably forming a continuation thereof on one side is a leaf 4 of transparent material, such as very thin paper, of such character that when the leaf 4 is superimposed upon the map 3, the map may be plainly seen through the leaf 4. This leaf 4 has printed thereon any desired lines, diagrams, symbols, etc., or any desired map details which are desired to be read in connection with the map 3. I have shown for instance this leaf 4 as being provided with a railway map, that is, as showing the various lines of railway which traverse the country illustrated in the map 3. This leaf 4 preferably contains only these lines and whatever words or symbols may be used therewith, as for instance it may show the various stations along the lines of the railways together with their names. When it is desired to read the map 3 as if the railway lines and stations therefor were printed thereon, it is only necessary to fold down the leaf 4 upon the map 3 whereupon the map 3 may be read through the leaf 4 and the two maps read in conjunction with each other. Also preferably forming a continuation of the leaf 3 upon which the map is placed, and adapted to be used in conjunction therewith and with the leaf 4, is a transparent leaf 5 which may have indicia, diagrams, informatory matter, etc., adapted to be read in conjunction either with the leaf 3 or the leaf 4. I have illustrated this leaf 5 as being provided upon its rear face, that is, the face which is the upper face when the leaf 5 is turned down upon the leaf 3, with a number of points, dots, crosses or other indicating marks which are adapted to register with various towns or other important points either upon the map 3 or upon the railway map 4, and in conjunction with these points, dots or other marks I provide certain reference or index numerals which relate to various pages in the railway folder upon which information relative to these towns or points of interest may be found, or in which time-tables relative to these places may be found.

It will be seen that with the map as illustrated, one fold or leaf is a simple map. The other fold or leaf is a railroad map with the stations marked thereon, and the other fold or leaf 5 is adapted to be folded over upon the railroad map leaf and give the number of time table in the folder or guide wherein the train schedule is to be found. The leaf 3 is preferably a topographical map in colors forming a basis for the lines on the leaf 4 indicating the various railroads.

While I have illustrated the map as being composed of leaves which fold laterally, it will of course be plain that I do not wish to limit myself to this as the map might be formed of leaves which fold longitudinally, or there might be attached to or formed with the leaf 3 a plurality of leaves, some of which would fold laterally and some longitudinally.

Preferably the map is formed of a single sheet of tough transparent paper folded twice so as to make the three sections 3, 4 and 5, these sections being of equal size. The first section, that is, the section 3 is the middle section and is to be pasted against one of the inside covers of the folder. This middle section preferably shows a topographical map in extremely bright colors, the colors preferably representing the topographical features or economical features. Thus mountain crests may be printed in white, wooded slopes in dark green, grazing slopes in lighter green, prairies a still lighter shade of green, deserts in gray, lakes and rivers in blue and so on, each shade of color representing the nature of its district. The reason for printing the topographical features in bright colors is to permit these features to show through the transparent paper when another section is folded over the next section.

While I have shown what I believe to be the best form of my invention, it will be obvious that it may be modified in many ways. Thus for guide books not having the folder form, the maps might be printed on separate leaves, the map leaf being the first in the series, leaf number 4 being the second of the series and leaf number 5 the third of the series. It will be obvious too that a transparent sheet of the character described might be folded in other ways so as to secure practically the same result and that one or more leaves could be superimposed upon the basic leaf or upon each other.

It will be seen that a chart constructed in accordance with my invention is interesting and is adapted to contain a large amount of informatory matter not possible to place upon ordinary maps. Further that the topographical map is entirely clear and is not confused by a jumble of black lines and small print. This map will obviate the necessity of straining the eyes in order to read the ordinary fine print in which it is necessary to print the names of stations, railway lines etc. to be found on the ordinary railway map.

My improved chart will show any given point much more clearly and quickly than the old form of map. It is extremely simple, may be adapted to a large variety of uses and may be placed in the ordinary railway folder without any additional work.

While I have illustrated my chart in connection with a railway folder, it is to be distinctly understood that the chart might be used in connection with guide books and also in connection with charts having other than topographical representations thereon.

What I claim is:

1. The combination with a book having certain numbered sections, of a chart used in connection therewith and including a leaf having thereon a map, a transparent leaf having thereon a diagram registering with and coördinating with said map, and a transparent leaf having thereon index marks registering with and relating to certain topographical points on said map and diagram, said index marks including reference characters referring to the corresponding sections of the book.

2. The combination with a book-like folder consisting of a plurality of sheets, the sheets being folded to form a plurality of leaves, of a chart sheet used in connection therewith and also folded to provide a plurality of leaves of the same size as the leaves of said folder, one of said leaves forming a basic leaf and attached to the folder and having thereon a map, the other leaves being of transparent material and foldable over upon said map, said transparent leaves having thereon indicia registering with and referring to localities on said map.

3. The combination with a folder having therein certain numbered sections containing time-tables, railway information and like matter, of a chart sheet attached to said folder, said sheet being foldable into three parts to form a middle leaf and two lateral leaves, the middle leaf having printed thereon a map, one of said lateral leaves being transparent and having printed thereon a railway diagram registering with and relating to said map, the other of said lateral leaves being transparent and having thereon index marks registering with localities indicated on said map and railway diagram, said index marks including reference characters relating to the said other folder sections whereon information relating to said localities is contained.

4. The combination with printed matter having numbered sections, of a chart to be used in connection therewith and including a leaf having thereon a map, and a plurality of transparent leaves, one of said leaves having thereon a diagram registering with and coördinating with said map and another of said leaves having thereon index marks registering with and relating to certain topographical points on the map and diagram, said index marks including reference characters referring to the corresponding sections of the printed matter.

In testimony whereof I affix my signature in presence of the witnesses.

JOEL RINDALL. [L. S.]

Witnesses:
E. E. DUTCHER,
H. N. SEGERSTROM,
R. J. MORTER.